(12) United States Patent
Nothnagel et al.

(10) Patent No.: US 6,277,953 B1
(45) Date of Patent: Aug. 21, 2001

(54) STABLE AQUEOUS POLYMER DISPERSIONS AND A PROCESS FOR THEIR PREPARATION

(75) Inventors: Joseph Leo Nothnagel, Woostock; Michael Davis Coad, Oak Park; Kevin Jude O'Callaghan, Algonquin; Carlos Alfredo Kienzie Sterzer, St. Charles, all of IL (US)

(73) Assignee: McWhorter Technologies, Inc., Carpentersville, IL (US)

(*) Notice: Subject to any disclaimer, the term of this patent is extended or adjusted under 35 U.S.C. 154(b) by 0 days.

(21) Appl. No.: 09/161,145

(22) Filed: Sep. 25, 1998

(51) Int. Cl.$^7$ .................. C08F 6/10; C08F 6/12; C08L 31/00; C08L 67/00; C08J 3/09
(52) U.S. Cl. .................. 528/489; 528/492; 528/499; 523/340; 523/501; 524/556; 524/832; 524/845
(58) Field of Search .................. 524/801, 832, 524/845, 556, 601; 528/489, 492, 499; 523/501

(56) References Cited

U.S. PATENT DOCUMENTS

| | | | |
|---|---|---|---|
| 3,886,103 | 5/1975 | Koizumi et al. .................. 260/22 |
| 3,904,575 | 9/1975 | Satokawa et al. .................. 260/32.8 |
| 3,907,741 | 9/1975 | Maker et al. . |
| 3,948,837 | 4/1976 | Schmitt et al. . |
| 4,107,126 | 8/1978 | Burke, Jr. et al. .................. 260/38 |
| 4,115,328 | 9/1978 | Bozzi et al. . |
| 4,116,903 | 9/1978 | Lietz et al. .................. 260/22 |
| 4,255,308 | 3/1981 | Brasen . |
| 4,312,795 | 1/1982 | Taguchi et al. .................. 260/18 |
| 4,384,056 | 5/1983 | Schmidt et al. .................. 523/221 |
| 4,413,071 | 11/1983 | Wistuba . |
| 4,458,040 | 7/1984 | Suzuki et al. . |
| 4,460,732 | 7/1984 | Buscall et al. . |
| 4,473,601 | 9/1984 | Kanatsu et al. .................. 427/274 |
| 4,506,040 | 3/1985 | Raes et al. . |
| 4,579,888 | 4/1986 | Kodama et al. . |
| 4,591,609 | 5/1986 | Kubo et al. . |
| 4,645,568 | 2/1987 | Kurps et al. . |
| 4,714,728 | 12/1987 | Graham et al. . |
| 4,745,151 | 5/1988 | Noll et al. . |
| 4,857,565 | 8/1989 | Henning et al. . |
| 4,904,724 | 2/1990 | Auchter et al. . |
| 4,952,623 | 8/1990 | Auchter et al. . |
| 5,035,944 | 7/1991 | Frazza et al. .................. 428/312.4 |
| 5,041,494 | 8/1991 | Franke et al. . |
| 5,041,495 | 8/1991 | Schwerzel et al. . |
| 5,051,464 | 9/1991 | Johnson et al. . |
| 5,055,516 | 10/1991 | Fisch et al. . |
| 5,068,266 | 11/1991 | Kogima et al. . |
| 5,093,390 | * 3/1992 | Shibato et al. .................. 524/845 |
| 5,102,946 | 4/1992 | Chen et al. . |
| 5,141,814 | 8/1992 | Anderson et al. .................. 428/407 |
| 5,173,523 | 12/1992 | Auchter et al. . |
| 5,270,119 | 12/1993 | Yanutola .................. 428/507 |
| 5,306,743 | 4/1994 | Klesse et al. .................. 523/201 |
| 5,319,019 | 6/1994 | Northnagel . |
| 5,326,808 | 7/1994 | Floyd et al. .................. 524/457 |
| 5,336,712 | 8/1994 | Austgen, Jr. et al. .................. 524/530 |
| 5,356,988 | 10/1994 | Nothnagel . |
| 5,380,771 | 1/1995 | Nothnagel . |
| 5,422,392 | 6/1995 | Floyd et al. .................. 524/457 |
| 5,449,707 | * 9/1995 | Higashiura et al. .................. 523/501 |
| 5,461,104 | 10/1995 | Daniel et al. .................. 524/505 |
| 5,484,840 | 1/1996 | Binkley .................. 524/501 |
| 5,504,129 | 4/1996 | Dandreaux et al. . |
| 5,504,162 | 4/1996 | Friedrich et al. . |
| 5,508,029 | 4/1996 | Petchul et al. . |
| 5,516,826 | 5/1996 | Schilling . |
| 5,530,045 | 6/1996 | Brena et al. . |
| 5,534,598 | 7/1996 | Guo . |
| 5,574,113 | 11/1996 | Kroner et al. . |
| 5,591,806 | 1/1997 | Recchia et al. . |
| 5,593,807 | 1/1997 | Sacripante et al. .................. 430/137 |
| 5,599,532 | 2/1997 | Faryniarz et al. . |
| 5,612,397 | 3/1997 | Gebhard et al. .................. 524/35 |
| 5,620,826 | 4/1997 | Tavernier et al. . |
| 5,648,193 | 7/1997 | Patel et al. .................. 430/137 |
| 5,648,405 | 7/1997 | Ma et al. . |
| 5,686,518 | 11/1997 | Fontenot et al. .................. 524/458 |
| 5,688,856 | 11/1997 | Austgen, Jr. et al. .................. 524/505 |
| 5,696,185 | 12/1997 | Beckerle et al. . |
| 5,705,560 | 1/1998 | Takarabe et al. . |
| 5,721,310 | 2/1998 | Sempio et al. . |
| 5,728,207 | 3/1998 | Arfaei et al. . |
| 5,731,368 | 3/1998 | Stanley et al. . |
| 5,736,601 | 4/1998 | Egraz et al. . |
| 5,753,742 | 5/1998 | Bumanlag . |
| 5,756,561 | 5/1998 | Wang et al. .................. 523/161 |
| 5,777,022 | 7/1998 | Bugajski et al. . |
| 5,777,071 | 7/1998 | Smith . |
| 5,783,303 | 7/1998 | Tsuei . |
| 5,849,072 | 12/1998 | Sommer et al. .................. 106/403 |

OTHER PUBLICATIONS

Padget, "Polymers for Water–Based Coatings—A Systematic Overview," J. of Coatings Technol., vol. 66, No. 839, pp. 89–105 (1994).

* cited by examiner

Primary Examiner—Tae H. Yoon
(74) Attorney, Agent, or Firm—Fitch, Even, Tabin & Flannery

(57) ABSTRACT

The present invention relates to stable aqueous polymer dispersions and a process for their preparation. The aqueous dispersions of the invention have less than about 2 weight percent organic solvent, at least about 30 weight percent solids, a mean particle size of not more than about 300 nm, and a viscosity of less than about 20.0 poise at about ambient temperature.

30 Claims, 1 Drawing Sheet

STABLE AQUEOUS POLYMER DISPERSIONS AND A PROCESS FOR THEIR PREPARATION

The present invention relates to stable aqueous polymer dispersions and a process for their preparation. More particularly, aqueous polymer dispersions are prepared by forming a polymer salt in a hydrophilic organic solvent and removing the hydrophilic organic solvent from a solvent blend of water and the hydrophilic organic solvent at temperatures which minimize the mean particle size of the polymer in the resulting aqueous dispersion of the polymer and/or removing the organic solvent from the polymer/organic solvent/water blend such that inversions do not occur.

BACKGROUND OF THE INVENTION

Protective and decorative coatings based on polyester, alkyd and acrylic polymers have been increasingly used in many applications because they provide a wide range of strength, flexibility, toughness, adhesion, degradation resistance and other film properties. Many are solution polymers because they are prepared and applied as solutions of organic polymers in organic solvents.

Environmental concern over the use of organic solvents has become increasingly important to the coating industry. This concern not only extends to preservation of the environment for its own sake, but extends to public safety as to both living and working conditions. Volatile organic emissions resulting from coating compositions which are applied and used by industry and by the consuming public are not only often unpleasant, but also contribute to photochemical smog. Governments have established regulations setting forth guidelines relating to volatile organic compounds (VOCs) which may be released to the atmosphere. The U.S. Environmental Protection Agency (EPA) established guidelines limiting the amount of VOCs released to the atmosphere, such guidelines being scheduled for adoption or having been adopted by various states of the United States. Guidelines relating to VOCs, such as those of the EPA, and environmental concerns are particularly pertinent to the paint and coating industry which uses organic solvents that are emitted into the atmosphere.

The use of aqueous dispersions of polymeric vehicles, or alternatively, high solids polymeric vehicles are two general approaches that have been used to reduce VOCs in coating compositions. Previous approaches for conventional aqueous systems have limited the molecular weights of the polymers used in the polymeric vehicle, which limits the impact resistance and other properties of the coating binders and films resulting from the polymeric vehicles.

The conventional process for the preparation of aqueous polymer dispersions is emulsion polymerization, in which hydrophilic assistants (emulsifiers and/or protective colloids) are used in order to ensure the stability of the dispersion. These assistants make the films produced from the dispersions somewhat sensitive to water.

Another way to reduce VOCs is to use water as a medium for the film-forming components in the polymeric vehicle. One approach is to make a polymer such as a polyester, alkyd, acrylic or epoxy polymer having carboxyl groups, or other ionizable groups and acid number in amounts effective such that when the carboxyl groups are converted into salts with a neutralizer such as an amine, they will permit the polymer or oligomer to be dispersed in a mixed solvent system which includes an organic solvent and water. The salt, such as an amine salt, of the oligomer or polymer disperses into the mixed water/organic solvent system with the formulation of a dispersion as opposed to a solution. This is commonly known as a water reducible system.

Organic solvent has typically been removed from water reducible systems through two routes. The first route utilizes low temperature boiling solvents that are water miscible and often form low temperature boiling azeotropes with water. These types of processes result in the loss of neutralizer and require addition of make-up neutralizer in the process. Further, use of insufficient solvent in these systems results in the polymer salt being insoluble with addition of water. Hence, an inversion takes place as solvent is stripped from the system.

The second route typically utilizes organic solvents that boil at temperatures greater than 100° C. and also often form azeotropes with water. Distillation proceeds at higher temperatures which, if the salt is an amine, will result in loss of amine, cause undesirable particle size variation in the dispersion and undesirably increase the average particle size of the resin in the dispersion. If distillation continues too long and too much amine is stripped, the dispersion will become unstable and fall apart.

To keep viscosities low, in some water reducible systems molecular weights of polymers have been kept low. As a result, these systems have required large amounts of cross-linker and cross-linking to achieve coatings performance. The use of higher molecular weight polymers in water reducible systems often results in unacceptably high processing viscosities due to the inversion from water in oil to oil in water. In addition, removal of water and solvent results in loss of neutralizer as described above, destabilization of the dispersion and undesirable large resin particle size.

Examples of processes for forming acrylic polymer dispersion are described in U.S. Pat. Nos. 5,319,019, 5,356,988 and 5,380,771. In each of these processes water immiscible solvents are used and solvent is stripped at high temperatures. High temperature stripping results in inversions which increase viscosity and result in increased particle size.

An object of the invention is to provide a polymeric vehicle which will reduce or minimize VOCs.

Another object of this invention is to provide polymeric vehicles which are not only low in VOCs, but which provide coating binders with good film properties such as hardness and impact resistance.

Another object of this invention is to provide a process for preparing stable aqueous polymer dispersions having higher solids content with resins having low acid values and higher molecular weights, yet also retain low processing viscosities while preparing the dispersions.

Yet another object of this invention is to control the viscosity to low levels of a liquid polymeric vehicle or liquid formulated coating composition with the use of water and with the minimization of organic solvents for such control.

Other objects, advantages, features and characteristics of the present invention will become more apparent upon consideration of the following description and the appended claims.

SUMMARY OF THE INVENTION

The present invention is directed to a dispersion process effective for providing a stable water dispersion of high molecular weight polymers. The aqueous dispersions of the invention have less than about 2 weight percent organic solvent, at least about 30 weight percent solids, and a viscosity of less than about 20.0 poise at about ambient temperature. In an important aspect of the invention, processing temperatures are minimized, mean particle size of the resins in the dispersions are kept to size of not more than about 300 nm and the dispersion process is inversionless.

In accordance with the dispersion process of the invention, an ionic functional polymer is synthesized in a hydrophilic organic solvent, or synthesized neat and subsequently mixed with organic hydrophilic solvent. In an important aspect of the invention, the polymer which is formed has an acid value of at least about 4, and has a solubility of at least about 50 weight percent in the hydrophilic solvent, based on the weight of the polymer and solvent, and the hydrophilic solvent has a solubility in water of at least about 5 weight percent at processing temperatures, based on the weight of the solvent and water mixture.

After the polymer is fully dissolved in the organic solvent, an amount of neutralizer is added effective for providing a dispersion of the polymer upon addition of water and removal of solvent. The neutralizer may be any salt-forming base compatible with the ionizable functional polymer such as sodium hydroxide or an amine. In a very important aspect the neutralizer is an amine type which is selected from the group consisting of ammonia, triethanol amine, dimethyl ethanol amine, and 2-amino-2-methyl-1-propanol. Not all of the ionizable groups on the polymers need to be reacted with the base (or neutralized).

Depending on the type of ionizable groups present in the polymer it may be important that the polymer is neutralized before it is blended with water so that water dispersible neutralized ionizable groups are generally evenly distributed throughout the polymer. After the formation of the polymer salt solution in the hydrophilic organic solvent, and mixing that solution with water to form a water/organic solvent/polymer salt blend, the organic solvent and water are removed or stripped from the blend at a duration, temperature and pressure effective for providing an aqueous dispersion having a resin mean particle size of not greater than about 300 nm, a polymer concentration of at least about 30 weight percent and an organic solvent concentration of less than 2 weight percent. In an important aspect, where the neutralizer is an amine or ammonia, the mean particle size of the resin is maintained with a stripping temperature of not more than about 65° C. at a pressure which permits such a stripping temperature.

In the final step of the process of the invention where the hydrophilic solvent is removed from the water/organic solvent/polymer salt blend, there is a steady small increase in viscosity without inversions due to the increase in non-volatile materials (NVM). Nevertheless, no viscosity spike is observed during processing. Inversions should be avoided because they will cause high processing viscosities. High processing viscosities will cause use of energy or heat (such as from applying high shear to maintain mixing), or in the alternative, will cause the use of large relative amounts of water or organic solvent which will cause disposal problems which increase processing costs and also increase raw material costs because the processing aids are ultimately disposed of.

It also should be recognized as important that the organic solvent is removed such that inversions do not take place during the strip of the organic solvent. With the elimination of inversions during processing, the viscosity of the system remains in the range of about 0.1 poise to about 20 poise at a temperature of about 25° C., and preferably about 1 to 20 poise, throughout the process, and a high viscosity spike normally attributed to dispersion processes does not occur. Because a high viscosity spike is never encountered during processing of the dispersion, a higher solids contents can be achieved. In a very important aspect of the invention, at 25° C. the dispersion will generally have a viscosity of less than about 10 poise.

In the alternative, the temperature of the strip is below the temperature at which substantial loss of neutralizer would otherwise occur. The mean particle size of the resin does not exceed more than about 300 nm, with a typical mean particle size range of about 40 nm to about 200 nm.

In an important aspect of the invention, polymers which can be dispersed in accordance with the present invention include condensation polymers, addition polymers, and polymers which are hybrids between condensation and addition polymers.

In an important aspect of the invention where the dispersion includes a condensation polymer the solids levels may be at least about 40 weight percent. In the aspect of the invention directed to condensation polymers, the resins have a number average molecular weight ($M_n$) of about 2,000 to about 10,000 and an acid value of at least about 4.

In another aspect, the polymers are addition polymers, such as acrylic polymers. In an important aspect, where the dispersions include an addition polymer, the solids level of the dispersion may be at least 30 weight percent. In the aspect of the invention directed to addition polymers, such as acrylic polymers, the acrylic has a $M_n$ of greater than about 3,000 and an acid value of at least about 4.

In another aspect of the invention, the polymer being dispersed in accordance with the invention is a hybrid between a condensation polymer and an addition polymer. In an important aspect, when the dispersion includes a hybrid polymer, the solids level of the dispersion may be at least about 30 weight percent. In the aspect of the invention directed to hybrid polymers, the hybrid polymers have a number average molecular weight of at least about 2,000 and an acid value of at least about 4.

DETAILED DESCRIPTION OF THE INVENTION

Definitions

Figure 1:
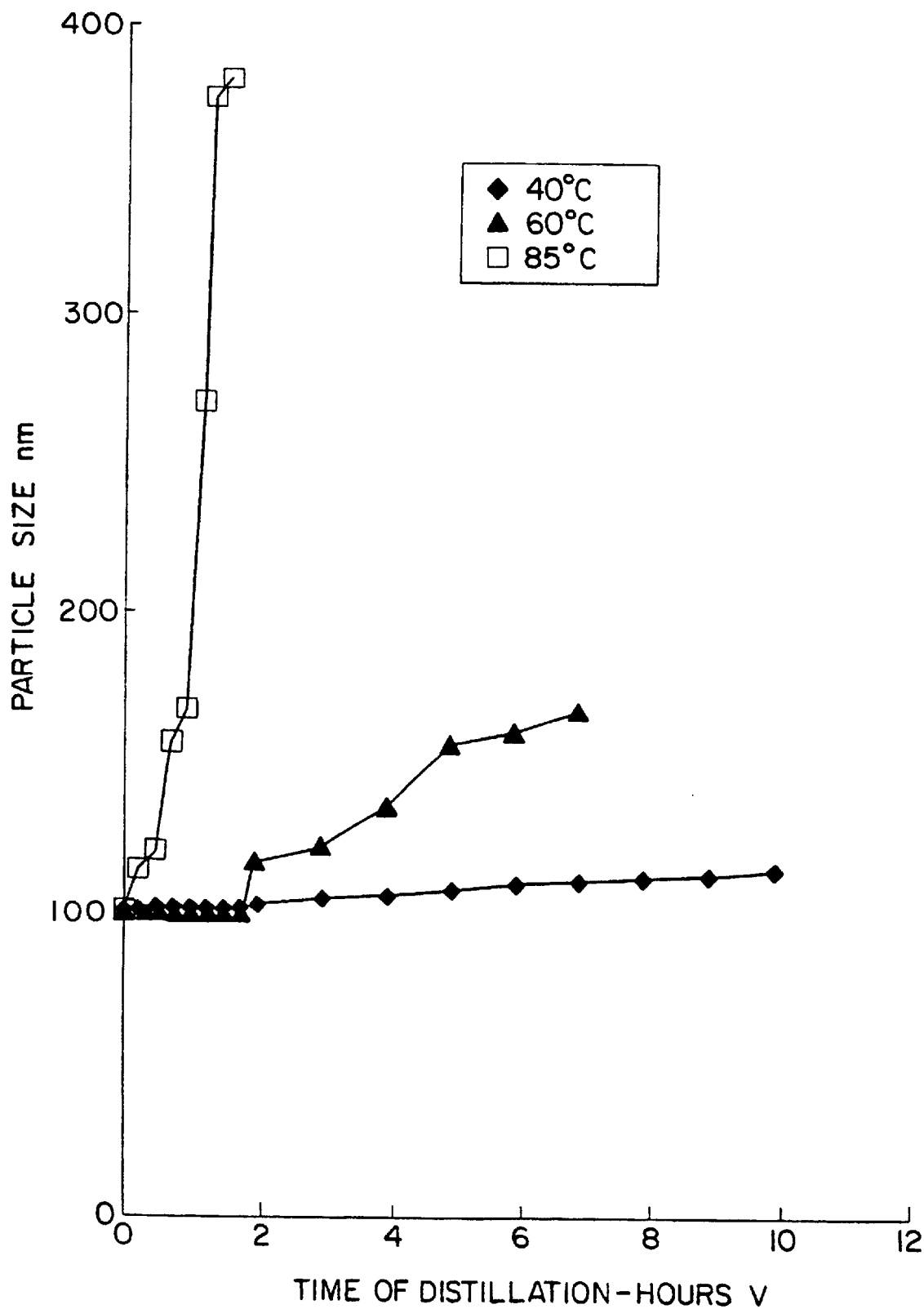
FIG. 1 shows the effect that temperature and time of distillation have when forming an alkyd dispersion with an amine (initial values were normalized to 100 nm).

"Polymeric vehicle" means all polymeric and resinous components in the formulated coating, i.e., before film formation, including but not limited to the water dispersible salt of a polymer. The polymeric vehicle may include a cross-linking agent.

"Coating binder" means the polymeric part of the film of the coating after solvent has evaporated, and with a thermosetting polymeric vehicle after cross-linking.

"Formulated coating" means the polymeric vehicle and solvents, pigments, catalysts and additives which may optionally be added to impart desirable application characteristics to the formulated coating and desirable properties such as opacity and color to the film.

The term "aqueous medium" as used herein means water and a mixture of water and hydrophilic organic solvent in which the content of water is at least 10% by weight. Examples of hydrophilic solvents include alkylalcohols such as isopropanol, methanol, ethanol, n-propanol, n-butanol, secondary butanol, tert-butanol and isobutanol, ether alcohols such as methyl cellosolve, ethyl cellosolve, propyl cellosolve, butyl cellosolve, methyl carbitol and ethyl carbitol, ether esters such as methyl cellosolve acetate and ethyl cellosolve acetate, dioxane, dimethylformamide, diacetone alcohol, methyl ethyl ketone, acetone, and tetrahydrofurfuryl alcohol.

"Ionizable group" refers to functional groups on the polymer that effect water dispersibility of the polymer. Examples of ionizable groups include —COOH, —SO$_3$H, —PO$_4$H$_2$, and mixtures thereof.

"Neutralizer" refers to compositions which can react with ionizable groups on the polymer to affect water dispersibility. Examples of neutralizers useful in the present invention include amines, ammonia, and metal hydroxides including NaOH and KOH. In an important aspect of the invention, the neutralizers are amines and ammonia.

"Cross-linker" means a di- or polyfunctional substance whose functional groups are capable of forming covalent bonds.

As used herein, the reaction product of an amine or ammonia with a carboxyl group produces a "salt".

"Substantially solventless" means a polymeric vehicle or formulated coating composition having not more than about five weight percent organic solvent.

"Solvent" means an organic solvent.

"Organic solvent" means a liquid which includes but is not limited to carbon and hydrogen which liquid has a boiling point in the range of not more than about 150° C. at about one atmosphere pressure.

"Hydrophilic solvent" means a solvent that has a solubility in water of at least about 5 weight percent.

"Volatile organic compounds" (VOCs) are defined by the U.S. Environmental Protection Agency at 40 C.F.R. 51.000 of the Federal Regulations of the United States of America.

A "high solids" or "high solids formulated coating composition" means an aqueous formulated coating composition containing more than about 30 weight percent solids, and in an important aspect of the present invention about 35 weight percent to about 70 weight percent solids as per ASTM test D-2369-92. "Film" is formed by application of the formulated coating composition to a base or substrate, evaporation of solvent, if present, and cross-linking if necessary.

"Air dried formulated coating composition" means a formulated coating composition that produces a satisfactory film without heating or baking, but which provides a satisfactory film at ambient temperature.

"Baked formulated coating composition" means a formulated coating composition that provides optimum film properties upon heating or baking above ambient temperature.

"Dispersion" in respect to a polymeric vehicle, formulated coating composition, or components thereof means that the composition must include a liquid and particles detectable by light scattering.

"Dissolved" in respect to a polymeric vehicle, formulated coating composition or components thereof means that the material which is dissolved does not exist in a liquid in particulate form where particles larger than single molecules are detectable by light scattering.

"Soluble" means a liquid or solid that can be partially or fully dissolved in a liquid. "Miscible" means liquids with mutual solubility. "Imbibe water" means a liquid is miscible with water.

"Acid number" or "acid value" means the number of milligrams of potassium hydroxide required for neutralization of or reaction with ionizable groups present in 1 g of material, such as resin.

"Hydroxyl number" or "hydroxyl value" which is also called "acetyl value" is a number which indicates the extent to which a substance may be acetylated; it is the number of milligrams of potassium hydroxide required for neutralization of the acetic acid liberated on saponifying 1 g of acetylated sample.

"Thermoplastic polymeric vehicle" is a polymeric vehicle which does not require cross-linking for a coating binder to form a film.

"Thermosetting polymeric vehicle" is a polymeric vehicle which irreversibly cross-links for a coating binder to form a film.

"Substantially free of emulsifier" means a composition with not more than about 0.5 weight percent emulsifiers. Aqueous dispersions of the present invention are substantially free of emulsifier.

As used herein the term "inversion" refers to a phase change where a mobile phase becomes a disperse phase. For example, an inversion takes place where sufficient oil is added to an oil in water phase such that phases invert to change from a oil in water phase to a water in oil phase. Conversely, in an "inversionless" system, the mobile phase does not become the dispersed phase and the corresponding increase in viscosity associated with dispersions does not occur. In an important aspect of the present invention, the viscosity of the system during processing remains less than about 20 poise, and in a very important aspect, less than about 10 poise at 25° C.

Stage One: Preparation of Resin

In accordance with stage one of the present invention, a polymer is synthesized neat or in an organic hydrophilic solvent which has limited to infinite solubility in water. Polymers useful in the present invention include condensation polymers such as polyesters having a molecular weight of about 2,000 to about 10,000, alkyds having a molecular weight of about 2,000 to about 10,000, addition polymers such as acrylic polymers having a molecular weight of at least about 3,000 and polymers which are hybrids of condensation and addition polymers having a molecular weight of at least about 2,000. In this aspect of the invention, alkyds and polyesters are synthesized neat and then dropped into solvent, whereas, acrylic is synthesized in solvent. In an important aspect of the invention, the polymers have an acid value of less than about 70 and in a very important aspect, where the ionizable groups are —COOH, about 10 to about 40. In a very important aspect of the invention where the ionizable group is derived from SSIPA (5-(sodiosulfo) isophthalic acid), the acid value may be as low as about 4. Minimization of acid values leads to improved film properties such as corrosion resistance, humidity resistance, and early water resistance.

In another important aspect of the invention, the polymers are blended with or synthesized in a solvent selected from the group consisting of alkylalcohols such as isopropanol, methanol, ethanol, n-propanol, n-butanol, secondary butanol, tert-butanol and isobutanol, ether alcohols such as methyl cellosolve, ethyl cellosolve, propyl cellosolve, butyl cellosolve, methyl carbitol and ethyl carbitol, ether esters such as methyl cellosolve acetate and ethyl cellosolve acetate, dioxane, dimethylformamide, diacetone alcohol, methyl ethyl ketone, acetone, and tetrahydrofurfuryl alcohol. The polymers of the invention have a solubility at processing temperatures in the hydrophilic solvent of at least about 50 weight percent, more preferably at least about 80 weight percent, based on the total weight of the composition.

Stage one provides a resin in a hydrophilic solvent which can be stored, and which can be further processed in stage two. In an important aspect, the resin provided in stage one has a storage stability of at least about 6 months.

Condensation Polymers

In an important aspect of the invention, polymers that can be dispersed in accordance with the present invention include condensation polymers such as polyesters and alkyds.

Polyester

In the aspect of the invention where polyesters are used, the polyester polymer has a number average molecular weight ($M_n$) of about 2,000 to about 10,000, preferably about 2,000 to about 6,000. In the aspect of the invention where —COOH is the ionizable group, the acid value is about 10 to about 40, preferably an acid value of about 15 to about 25, and where the ionizable group(s) includes —SO$_3$H, the acid value can be as low as about 4. "Polyester" means a polymer which has

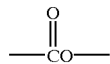

linkages in the main chain of the polymer.

Polyesters are reaction products of polyhydric alcohols and polycarboxylic acids. Examples of suitable polyhydric alcohols include triols and tetraols such as trimethylolpropane, trimethylolethane, tris(hydroxyethyl) isocyanurate, glycerine, and pentaerythritol, and dihydric alcohols or diols that may include neopentyl glycol, dimethylol hydantoin, ethylene glycol, propylene glycol, 1,3-butylene glycol, diethylene glycol, dipropylene glycol, 1,4-cyclohexane dimethanol, Esterdiol 204 (trademark of Union Carbide), 1,3-propane diol, and 1,6-hexanediol.

Carboxylic acids utilized in the invention may be aromatic carboxylic acids such as isophthalic acid, terephthalic acid, phthalic acid, phthalic anhydride, dimethyl terephthalic acid, naphthalene decarboxylate, tetrachlorophthalic acid, terephthalic acid bisglycol ester, and benzophenone dicarboxylic acid; and cycloaliphatic and aliphatic carboxylic acids.

Alkyd

In the aspect of the invention where alkyds are used, the alkyd polymer has a $M_n$ of about 2,000 to about 10,000, preferably about 2,000 to about 6,000. In the aspect of the invention where —COOH is the ionizable group, the acid value is about 10 to about 40, preferably an acid value of about 15 to about 25, and where the ionizable group(s) includes —SO$_3$H, the acid value can be as low as about 4.

An alkyd resin is an oil modified polyester resin and broadly is the product of the reaction of a di- or polyhydric alcohol and a di- or poly- basic acid or acid derivative in the presence of an oil, fat or carboxylic acid derived from such oil or fat which acts as a modifier. Such modifiers are typically drying oils.

The dihydric or polyhydric alcohol employed is suitably an aliphatic alcohol; suitable alcohols include glycol, 1,2- or 1,3-propylene glycol, butane diol, hexane diol, neopentyl glycol, glycerol, trimethylolethane, trimethylolpropane and pentaerythritol. Mixtures of the alcohols may also be employed, particularly to provide a desired content of hydroxyl groups.

The dibasic or polybasic acid, or corresponding anhydrides employed may be selected from a variety of aliphatic and aromatic carboxylic acids. Suitable acids and acid anhydrides include, by way of example, adipic acid, phthalic anhydride, isophthalic acid and bis 3,3', 4,4'-benzophenone tetracarboxylic anhydride. Mixtures of these acids and anhydrides may be employed to produce a balance of properties.

Addition Polymers

In another important aspect of the invention, polymers that can be dispersed in accordance with the present invention include addition polymers such as acrylics and includes polymers formed by Diels-Alder reactions.

Acrylic

In the aspect of the invention where acrylic is used, the acrylic polymer has a $M_n$ of greater than about 3,000. In the aspect of the invention where —COOH is the ionizable group, the acid value is about 10 to about 40, preferably an acid value of about 10 to about 25. Where the ionizable group(s) includes —SO$_3$H, the acid value can be as low as about 4.

The acrylic resin used in this invention may be any acrylic resin which has an acid value within the aforesaid range. The acrylic resin may be composed of a copolymer of an ethylenically unsaturated carboxylic acid or its anhydride which gives carboxyl groups of the aforesaid acid value to the resin and an acrylic or methacrylic ester and as desired, another ethylenically unsaturated monomer copolymerized with these monomers. Examples of the ethylenically unsaturated carboxylic acid or its anhydride include acrylic acid, methacrylic acid, crotonic acid, maleic acid, phthalic acid, itaconic acid, citraconic acid, maleic anhydride, and itaconic anhydride. Examples of the ethylenically unsaturated monomers with ionizable groups other than —COOH include acrilamido (2-methyl propane sulfonic acid), vinyl phosphonic acid, and sodium styrene sulfonate. Examples of the acrylic or methacrylic ester include methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate and n-octyl (meth)acrylate. The (meth)acrylate represents an acrylate and a methacrylate.

The other comonomers to be copolymerized with these monomers may be, for example, styrene, vinyltoluene, acrylonitrile, or methacrylonitrile.

Hybrid Polymers

In another aspect of the invention, polymers or resins that can be dispersed in accordance with the present invention include polymers which are hybrids of condensation polymers and addition polymers. The hybrid polymers may be any combination of one or more condensation polymers and one or more addition polymers which combination has an acid value within the aforesaid range and a number average molecular weight of at least about 2,000. Examples of hybrid resins are described in Padget, "Polymers for Water-Based Coatings—A Systemic Overview," *Journal of Coatings Technology*, 66:89–105 (1994), which is hereby incorporated by reference. In a very important aspect of the invention, hybrid polymers include epoxy modified alkyds or polyesters, acrylic modified alkyd, styrene modified alkyds, and vinyl toluene modified alkyds.

Stage Two: Resin Dispersion

Neutralizing The Resin

In an important aspect of the invention, the polymer salt is formed in situ in the organic solvent with water being mixed with the polymer salt/organic solvent combination. In accordance with the invention, neutralizer is added to an organic solvent solution containing the resin in an amount effective for neutralizing the resin to provide sufficient salt to render the resin dispersible in water. Neutralizer useful in the present invention include but are not limited to ammonia, triethanol amine, dimethyl ethanol amine, 2-amino-2-methyl-1-propanol, NaOH and KOH.

The amount of neutralizer added is dependent on chemistry type, acid value and molecular weight. In one aspect, where the ionizable group is carboxyl, from about 30 to about 70 percent of the carboxyl groups are neutralized to obtain the solids level and low VOC level of the dispersions of the invention, but all of the carboxyl groups may be neutralized. In another aspect, where the polymer is a polyester or alkyd, neutralizer is mixed with the polymer in an amount effective to provide at least about 70 parts polymer salt in less than about 30 parts solvent wherein with subsequent mixing with water, the neutralized polymer will provide a dispersion which comprises not more than about 60 weight percent water, based on the weight of the dispersion. In the aspect of the invention where the polymer is an acrylic polymer, neutralizer is added to the acrylic polymer in an amount effective to provide at least about 40 parts polymer salt in less than about 60 parts organic solvent, where with subsequent mixing of the acrylic polymer salt solution with water the acrylic polymer will form a dispersion comprising not more than about 70 weight percent water, based on the weight of the dispersion.

In a very important aspect of the invention, where the ionizable group is carboxyl the alkyd requires between about 60% to about 100% neutralization to stabilize the dispersion; the polyester requires about 50% to about 80% neutralization to stabilize the dispersion; the acrylic requires about 30% to about 70% neutralization to stabilize the dispersion, and the styrene modified alkyd requires about 50% to about 80% neutralization to stabilize the dispersion.

In another important aspect of the invention, the process provides a mean particle size of not more than about 300 nm, with a typical mean particle size range of about 40 nm to about 200 nm as measured by laser light scattering.

The polymer can be preneutralized by making the polymer with metal, amine or ammonia salts of the ionizable groups such as —COOH, —SO$_3$H, —PO$_4$H$_2$, and mixtures thereof. The polymer made from these "preneutralized" monomers would have an acid value, as measured by titration, of at least about 4 if the ionizable groups which form part of the polymer were not already neutralized. In this aspect of the invention, monomers have a polyfunctionality such as a difunctionality which permits them to form polymers that also have the salt form of the ionizable groups.

An example of such a monomer is

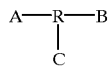

where A and B are —OH and/or —COOH which can form a polyester in a condensation reaction and C is selected from the group consisting of —COOX, —SO$_3$X and —PO$_4$Y$_2$, where X is an alkali metal such as sodium or potassium and one Y may be H, but at least one or both Ys are alkali metals such as sodium or potassium. In an important aspect, R is a phthalic type diacid, such as isophthalic acid, and C is —SO$_3$X, where X is Na or K, and where the carboxyl groups form a residue in the condensation polymer, such as after reaction with a polyol.

As can be seen, condensation polyester polymers can be made with 5-(sodiosulfo) isophthalic acid which would result in condensation polymers which are condensed through the carboxyl groups of the acid with free —SO$_3$Na groups. The same could be done with 5-(potassiosulfo) isophthalic acid. When neutralized polymers are made in this way, the neutralized polymer should be soluble in the hydrophilic solvent, and in an important aspect, the neutralized polymer is at least 50 weight percent soluble in the hydrophilic solvent. In an important aspect, when —SO$_3$H is included as an ionizable group, as low as about 10 percent of the ionizable groups may be neutralized to obtain the solids level and low VOC level of the dispersion of the invention.

Addition of Water

In the next step of stage two of the process, water having a temperature of about 25° C. to about 65° C. is mixed with or added to the neutralized resin solution. Lower temperatures provide smaller mean particle sizes.

In an important aspect of the invention, the initial ratio of solvent to water is about 1 to about 3.5 for alkyd and polyester polymer and about 1 to about 1.5 for acrylic polymer. The initial ratio of solvent to water is important to ensure that inversion does not take place during subsequent stripping of solvent. The amount of water to be added may be greater than that required to obtain the desired solids of the final dispersion. Some water loss typically occurs during solvent distillation. The system requires sufficient solvent at the beginning to solubilize the salt prior to water addition.

In an alternative aspect of the invention, polymer in hydrophilic solvent is added to water that already contains a neutralizer.

Removal of Solvent

In the next step of the process, the organic solvent and water if required are removed or stripped from the neutralized resin/water/solvent mixture. A reduced atmospheric pressure may be applied to the mixture to aid in the removal of solvent and water. In an important aspect, vacuum may range from about 22 inches to about 29 inches of mercury gauge. With lower temperatures, a higher vacuum must be used to remove solvent. Lower reaction temperatures result in less foaming, as the higher vacuum coupled with the surface tension of the bubbles helps to break the bubbles. In another aspect of the invention, solvent/water is stripped with heat being supplied through the use of a heat exchanger. Use of a heat exchanger may reduce distillation times and temperatures and further minimize destruction of the salt.

In a very important aspect of the invention, solids levels of at least about 40 weight percent to about 50 weight percent can be attained for alkyd, at least about 30 weight percent to about 45 weight percent can be attained for polyesters and acrylics.

In another aspect of the invention, solvent that is removed can be purified and reused. A simple flash or multiple stage distillation is sufficient to clean the solvent of any contamination.

In an alternative aspect, the invention permits manufacture of the water dispersion from the polymer using one reaction vessel. The water dispersion of the invention does not require emulsifying agents and does not have more than about 2 weight percent, based on the weight of the composition, of organic solvent after the distillation of the solvent. In an important aspect, the aqueous dispersion contains from about 0.2 to about 2 weight percent organic solvent.

The water dispersion of the invention includes the water dispersible amine salt of the polymer as well as the unsalified polymer, but in the aspect of the invention where the ionizable group is a carboxyl, the aqueous dispersion of the invention does not have less than 30 percent of the free carboxyl groups of the polymer neutralized or converted into a salt. As the acid number of the polymer goes down, the higher the percent of the carboxyl groups on the polymer must be neutralized. Where the ionizable groups are —COOH, to maintain the dispersion below an acid value of about 15, about 100% of the carboxyl groups on the polymer should be neutralized to the salt. In an important aspect of the invention, about 100% of the carboxyl groups on the polymer are neutralized to the salt and the dispersions of the invention do not have more than about 1 pound per gallon of dispersion (120 g/l) VOCs, and in a very important aspect the dispersion has about 0.2 pounds per gallon of dispersion VOCs. The water dispersion of the invention with about 0.2 pounds per gallon VOC is stable through at least about 1 freeze-thaw cycle, and up to about 4 freeze-thaw cycles. Freeze-thaw cycles can be increased with small amounts of solvents or glycols as is typically used for latex systems.

An important aspect of the invention is a polymeric vehicle which may be air dried at ambient temperatures to provide a coating binder of a coating composition. In this aspect of the invention, as well as the aspect of the invention which provides a coating binder which is thermoset with a cross-linking agent above ambient temperatures, the polymeric vehicle which includes the water dispersion of the invention provides a formulated coating composition having VOCs of less than 1 pound per gallon of formulated coating composition, includes water dispersible polymers and salts thereof having the above indicated molecular weights and not only eliminates a need for, but is substantially free of emulsifiers, surfactants and coalescents.

Water dispersion of such high molecular weight polymers provide a coating binder with improved film performance characteristics which include, but are not limited to, improved lay down performance of the wet film, enhanced film build of the film per pass, faster dry fiber times, improved corrosion resistant films per pass, faster dry fiber times, improved corrosion resistant films, harder films, more abrasion resistant films, and improved humidity resistant films. The polymeric vehicle of the invention also provides coating binders for improved exterior "ultraviolet resistant" durable films which are derived from an aqueous low VOC formulated coating composition. Films provided from the invention are improved over that of aqueous thermoplastic emulsions or water reducible systems of low molecular weight thermoplastic or those thermosetting polymers requiring cross-linking.

The following examples illustrate methods for carrying out the invention and should be understood to be illustrative of, but not limiting upon, the scope of the invention which is defined in the appended claims.

EXAMPLE 1

ALKYD DISPERSION

Synthesis of an Alkyd Polymer:

1. 605 grams of Pamolyn 200 (Hercules) was charged to a round bottom flask equipped with a packed column, receiver, and nitrogen blanket.
2. The flask was heated to 130 degrees centigrade and 727 grams of trimethylolpropane (TMP), 20 grams of palmitic acid, 15 grams of stearic acid, 88 grams of benzoic acid (BA), 686 grams of isophthalic acid (IPAc) and 0.45 grams of FASCAT 4100 (Elf AtoChem) were added with mixing.
3. The temperature was steadily and gradually increased to 220 degrees centigrade and waters of esterification were removed.
4. When the acid value was 4.8, the temperature was reduced to 170 degrees centigrade and the mode of operation was switched to a straight total condenser.
5. 176 grams of trimellitic anhydride (TMA) was added to the flask and the temperature was maintained at 170 degrees centigrade.
6. Waters of esterification were removed until an acid value of 25.6 was reached.
7. The temperature was reduced to 140 degrees centigrade and the polymer was transferred to a flask containing isopropanol (IPA).

PROPERTIES OF THE ALKYD SOLUTION

| Percent Solids | (NVM) | 70.2% |
|---|---|---|
| Acid Value | (AV#) | 25.6 |
| Molecular Weight | (Mn) | 3197 |
| Viscosity | (cps) | 7212 |

Preparation of Alkyd Dispersion 1. 1700 grams of the alkyd solution in isopropanol (IPA) was charged to a round bottom flask equipped with a simple condenser and receiver.
2. The flask was heated to 50 degrees centigrade with mild mixing.
3. Upon reaching temperature, 42 grams of triethylamine (TEA) was added directly into the flask and mixed for 15 minutes.
4. 2000 grams of water was then added over ½ hour. After all of the water was added, mixing was continued for an additional ½ hour.
5. Vacuum was applied to the flask and slowly increased to a maximum of 29 inches of mercury. The temperature of the flask was maintained at 50 degrees centigrade.
6. Vacuum was continued until 565 grams of distillate was removed. At no time during the vacuum step was there any viscosity spike observed.
7. After the desired amount of distillate was obtained, the vacuum was broken and the resulting product analyzed.

PROPERTIES OF THE ALKYD DISPERSION

| Percent Solids | (NVM) | 30.8% |
|---|---|---|
| Viscosity | (cps) | 355 |

EXAMPLE 2

ACRYLIC DISPERSION

Synthesis of an Acrylic Polymer:

1. 1400 grams of isopropanol (IPA) was charged to a round bottom flask equipped with a simple condenser with return to reactor.
2. The flask was heated to 83 degrees centigrade and that temperature was maintained through out the course of the reaction.
3. 130 grams of hydroxyethyl methacrylate, 606 grams of methyl methacrylate, 610 grams of butyl methacrylate, 54 grams of methacrylic acid and 7 grams of t-butyl peroctoate were premixed and added to the flask over 3 hours.

4. 700 grams of IPA was then added and mixing continued until a viscosity of 7000 cps was obtained.

PROPERTIES OF THE ACRYLIC SOLUTION

| Percent Solids | (NVM) | 40.3% |
|---|---|---|
| Acid Value | (AV#) | 25.6 |
| Molecular Weight | (Mn) | 3563 |
| Viscosity | (cps) | 8095 |

Preparation of Acrylic Dispersion
1. 400 grams of the acrylic solution in isopropanol (IPA) was charged to a 2 liter round bottom flask equipped with a simple condenser and receiver.
2. The flask was heated to 60 degrees centigrade with mild mixing.
3. Upon reaching temperature, 5.8 grams of triethylamine (TEA) was added directly into the flask and mixed for 15 minutes.
4. 380 grams of water was then added over ½ hour. After all of the water was added, mixing was continued for an additional ½ hour.
5. Vacuum was applied and slowly increased to a maximum of 29 inches of mercury. The temperature of the flask was maintained at 50 degrees centigrade.
6. Vacuum was continued until 300 grams of distillate was removed. At no time during the vacuum step was there any viscosity spike observed.
7. After the desired amount of distillate was obtained, the vacuum was broken and the resulting product analyzed.

PROPERTIES OF THE ACRYLIC DISPERSION

| Percent Solids | (NVM) | 33.2% |
|---|---|---|
| Viscosity | (cps) | 300 |

EXAMPLE 3

POLYESTER DISPERSION

Synthesis of a Polyester Polymer:
1. 1055 grams of neopentyl glycol (NPG) was charged to a round bottom flask equipped with a packed column, receiver, and nitrogen blanket.
2. The flask was heated to 130 degrees centigrade and 650 grams of trimethylolpropane (TMP), 1035 grams of isophthalic acid (IPAc), 1035 grams of adipic acid (AA) and 0.45 grams of FASCAT 4100 (Elf Atochem) were added with mixing.
3. The temperature was steadily and gradually increased to 220 degrees centigrade and waters of esterification were removed.
4. When the acid value was 4.7, the temperature was reduced to 170 degrees centigrade and the mode of operation was switched to a straight total condenser.
5. 203 grams of trimellitic anhydride (TMA) was added to the flask and the temperature was maintained at 170 degrees centigrade.
6. Waters of esterification were removed until an acid value of 31.9 was reached.
7. The temperature was reduced to 140 degrees centigrade and the polymer was transferred to a flask containing isopropanol (IPA).

PROPERTIES OF THE POLYESTER SOLUTION

| Percent Solids | (NVM) | 68.3% |
|---|---|---|
| Acid Value | (AV#) | 31.9 |
| Molecular Weight | (Mn) | 2789 |
| Viscosity | (cps) | 4125 |

Preparation of Polyester Dispersion
1. 1800 grams of the polyester solution in isopropanol (IPA) was charged to a 5 liter round bottom flask equipped with a simple condenser and receiver.
2. The flask was heated to 50 degrees centigrade with mild mixing.
3. Upon reaching temperature, a premix of 150 grams of water and 49 grams of ammonium hydroxide solution (19%) was added directly into the flask and mixed for 15 minutes.
4. 1750 grams of water was then added over ½ hour. After all of the water was added, mixing was continued for an additional ½ hour.
5. Vacuum was applied to the flask and slowly increased to a maximum of 29 inches of mercury. The temperature of the flask was maintained at 50 degrees centigrade.
6. Vacuum was continued until 635 grams of distillate was removed. At no time during the vacuum step was there any viscosity spike observed.
7. After the desired amount of distillate was obtained, the vacuum was broken and the resulting product analyzed.

PROPERTIES OF THE POLYESTER DISPERSION

| Percent Solids | (NVM) | 40% |
|---|---|---|
| Viscosity | (cps) | 1070 |

EXAMPLE 4

SSIPA BASED ALKYD

Synthesis of a SSIPA/NPG Adduct
1. 461.1 grams of neopentyl glycol (NPG), 278.5 grams of 5-sodiosulfoisophthalic Acid (SSIPA), 51.3 grams of water, and 0.66 grams of Fascat 4100 were charged to a round bottom flask equipped with condenser, nitrogen sparge, temperature control and stirring.
2. The initial temperature was set to 100° C. until the reactor contents became a mobile opaque white slurry. The temperature was then set to and maintained at 190° C. until the mixture cleared and the acid value as measured by titration was below 3.

Synthesis of SSIPA based Alkyd Polymer
1. 206 grams of the SSIPA/NPG adduct, 325 grams of pentaerythritol (PE), 368.2 grams of phthalic anhydride (PA), 1,112 grams of Pamolyn 200 and 1.75 grams of Fascat 4100 were loaded into the reactor and the temperature set to 130° C.
2. After an hour the temperature was set to 180° C. and soon thereafter the first waters of esterification were removed.
3. The temperature was increased in 10° C. increments every 2 hours until 210° C. was reached. After 2 hours at 210° C. the partial condenser was removed and a straight total condenser used.

4. Waters of esterification were removed until an acid value of 4.7 was reached (as measured by titration).
5. The temperature of the reactor was reduced and the neat alkyd resin poured into cans for further use.

Preparation of SSIPA Alkyd Solution

1. The neat alkyd was heated in a 50° C. oven and then 750 grams were weighed into a 2 liter round bottom flask equipped with condenser.
2. The temperature was heated to 60° C. under nitrogen blanket and then 187.5 grams of isopropanol were added. The temperature was heated to 80° C. and held for an hour under good mixing.
3. The resin solution, at 80 percent solids, was then cooled and poured into a container.

Preparation of SSIPA Alkyd Dispersion 1. 450 grams of the SSIPA based alkyd resin in isopropanol were heated to 60° C. in a 2 liter round bottom flask equipped with stirrer, nitrogen inlet, condenser and thermocouple.
2. 720 grams of water were then added to the flask at a constant rate over 20 minutes. The mixture was then held at 60° C. for 30 minutes.
3. A receiver system was added and using a water aspirator vacuum was applied to the flask. After 108 grams of distillate were collected, the contents of the flask were cooled and filtered. At no time during the vacuum step was there any viscosity spike observed.

| Properties | |
| --- | --- |
| Percent Solids (NVM) | 34.8% |
| Particles size (Coulter ND-4): | 193 nm and monodisperse |

EXAMPLE 5

EPOXY ESTER DISPERSION

Synthesis of an Epoxy Ester:

1. 513 grams of Pamolyn 327B (Hercules) was charged to a round bottom flask equipped with a packed column, receiver, and nitrogen blanket.
2. The flask was heated to 130 degrees centigrade and 547 grams of Epon 828 (Ciba Geigy), 128 grams of bisphenol A, 0.4 grams triphenylphosphine and 2 grams of zirconium octoate (12%) were added with mixing.
3. The temperature was steadily and gradually increased to 220° C. and waters of esterification were removed.
4. When the acid value was 2, the temperature was reduced to 140° C. and 504 grams of Pamolyn 327B (Hercules) and 135 grams of SAA-101 (Arco) were added.
5. The temperature was steadily and gradually increased to 220° C. and waters of esterification were removed.
6. When the acid value was 4.2, the temperature was reduced to 140° C. and the polymer was transferred to a flask containing isopropanol. The resulting solution was measured at 89.8% solids (NVM) in isopropanol.
7. 778 grams of the resulting resin solution was placed in a flask; the temperature was raised to 80° C. and 214 grams of additional isopropanol were added with mixing.
8. To the flask 295 grams of styrene, 107 grams of acrylic acid and 5.0 grams of t-butyl peroctoate (premixed) were added slowly and continuously over a 3 hour period.
9. After the addition of monomers and catalyst, temperature was maintained at 80° C. until at least 98% conversion was obtained for the reaction.

PROPERTIES OF THE EPOXY ESTER

| Percent Solids | (NVM) | 70.2% |
| --- | --- | --- |
| Acid Value | (AV#) | 67 |
| Molecular Weight | (Mn) | 3462 |
| Viscosity | (cps) | 15000 |

Preparation of an Epoxy Ester Dispersion:

1. 1700 grams of the epoxy ester solution in Isopropanol was added to a round bottom flask equipped with a simple condenser and receiver.
2. The flask was heated to 45° C. under mild mixing.
3. A premix of 200 grams water and 120 grams of Ammonia (19%) was added directly into the flask and mixed for 15 minutes.
4. 1600 grams of water was added slowly over a ½ hour period. Mixing continued for an additional ½ hour period.
5. Vacuum was applied and slowly increased to a maximum of 30 inches of mercury. Temperature was maintained at around 45° C.
6. Vacuum continued until 520 grams of distillate was removed. At no time during the vacuum step was there any viscosity spike observed.
7. After the desired amount of distillate was obtained, the vacuum was broken and the resulting product analyzed.

PROPERTIES OF THE EPOXY ESTER DISPERSION

| Percent Solids | (NVM) | 39.2% |
| --- | --- | --- |
| Viscosity | (cps) | 1525 |

EXAMPLE 6

STYRENE MODIFIED ALKYD DISPERSION

Synthesis of an Styrene Modified Alkyd:

1. 997 grams of TOFA 4% (Hercules) was charged to a round bottom flask equipped with a packed column, receiver, and nitrogen blanket.
2. The flask was heated to 130 degrees centigrade and 168 grams of propylene glycol, 277 grams of pentaerythritol, 40 grams of trimellitic anhydride and 638 grams of phthalic anhydride were added with mixing.
3. The temperature of the reactor was steadily and gradually increased to 220° C. and waters of esterification were removed.
4. When the acid value was 43.5, the temperature was reduced to 140° C. and the polymer was transferred to a flask containing 500 grams of isopropanol solvent.
5. 734 grams of the resulting resin solution was placed in a flask; the temperature was raised to 80° C. and 225 grams of additional isopropanol were added with mixing.

6. To the flask 210 grams of styrene, 70 grams of acrylic acid and 10 grams of t-butyl peroctoate (premixed) were added slowly and continuously over a 3 hour period.
7. After the addition of monomers and catalyst, temperature was maintained at 80° C. until at least 98% conversion was obtained for the reaction.

PROPERTIES OF THE STYRENE MODIFIED ALKYD

| Percent Solids | (NVM) | 70.1% |
|---|---|---|
| Acid Value | (AV#) | 68.5 |
| Molecular Weight | (Mn) | 4773 |
| Viscosity | (cps) | 17000 |

Preparation of a Styrene Modified Alkyd Dispersion
1. 840 grams of the styrene modified alkyd in isopropanol was added to a round bottom flask equipped with a simple condenser and receiver.
2. The flask was heated to 45° C. under mild mixing.
3. A premix of 160 grams of water and 50 grams of Ammonia (19%) was added directly into the flask and mixed for 15 minutes.
4. 725 grams of water was added slowly over a ½ hour period. Mixing continued for an additional ½ hour period.
5. Vacuum was applied and slowly increased to a maximum of 30 inches of mercury. Temperature was maintained at around 45° C.
6. Vacuum continued until 275 grams of distillate was removed. At no time during the vacuum step was there any viscosity spike observed.
7. After the desired amount of distillate was obtained, the vacuum was broken and the resulting product analyzed.

PROPERTIES OF THE STYRENE MODIFIED ALKYD DISPERSION

| Percent Solids | (NVM) | 39.7% |
|---|---|---|
| Viscosity | (cps) | 1888 |

EXAMPLE 7

ACRYLIC MODIFIED ALKYD DISPERSION
Synthesis Of An Acrylic Modified Alkyd
1. 1200 grams of dehydrated castor oil (DCO) Fatty Acid (Hercules) was charged to a round bottom flask equipped with a packed column, receiver, and nitrogen blanket.
2. The flask was heated to 130° C. and 538 grams of trimethyol propane and 32 grams of isophthalic acid were added with mixing.
3. The temperature was steadily and gradually increased to 220° C. and waters of esterification were removed.
4. When the acid value was 4.1, the temperature was reduced to 180° C. and 346 grams of trimellitic anhydride (TMA) was added. When the acid value was 51.4, the temperature was reduced to ambient.
5. A 697 gram aliquot of the resulting polymer was mixed with 400 grams of isopropanol at 80° C. To this solution, 474 grams of methyl methacrylate, 54 grams of acrylic acid, 148 grams of butyl methacrylate, and 10 grams of t-butyl peroctoate (premixed) were added slowly and continuously over a 3 hour period.
6. After the addition of monomers and catalyst, temperature was maintained at 80° C. until at least 98% conversion was obtained for the reaction.

PROPERTIES OF THE ACRYLIC MODIFIED ALKYD

| Percent Solids | (NVM) | 70% |
|---|---|---|
| Acid Value | (AV#) | 46.1 |
| Molecular Weight | (Mn) | 2372 |
| Viscosity | (cps) | 17000 |

Preparation Of An Acrylic Modified Alkyd Dispersion:
1. 1000 grams of the acrylic modified alkyd in isopropanol was added to a round bottom flask equipped with a simple condenser and receiver.
2. The flask was heated to 45° C. under mild mixing.
3. A premix of 100 grams of water and 50 grams of ammonia (19%) was added directly into the flask and mixed for 15 minutes.
4. 950 grams of water was added to the flask slowly over a ½ hour period. Mixing continued for an additional ½ hour period.
5. Vacuum was applied and slowly increased to a maximum of 30 inches of mercury. Temperature was maintained at around 45° C.
6. Vacuum continued until 275 grams of distillate was removed. At no time during the vacuum step was there any viscosity spike observed.
7. After the desired amount of distillate was obtained, the vacuum was broken and the resulting product analyzed.

PROPERTIES OF THE ACRYLIC MODIFIED ALKYD DISPERSION

| Percent Solids | (NVM) | 39.7% |
|---|---|---|
| Viscosity | (cps) | 1029 |

Numerous modifications and variations in practice of the invention are expected to occur to those skilled in the art upon consideration of the foregoing detailed description of the invention. Consequently, such modifications and variations are intended to be included within the scope of the following claims.

What is claimed is:
1. A process which forms a stable aqueous dispersion of a polyester polymer or alkyd polymer which is substantially free of an emulsifier, the process comprising;
condensing monomers to form a polymer selected from the group consisting of a polyester polymer, alkyd polymer and mixtures thereof, the polymer which results from the condensation reaction having an acid value in the range of from about 10 to about 40 and a number average molecular weight in the range of from about 2,000 to about 10,000, wherein the polymer is mixed with an organic hydrophilic solvent to form a solution of the polymer in the organic solvent, the polymer is soluble in the hydrophilic organic solvent, and the organic hydrophilic solvent has a solubility in water of at least about 5 weight percent;

neutralizing the ionizable groups of the polymer by mixing the polymer with an amount of neutralizer effective to form a neutralized polymer salt and form a solution of the neutralized polymer salt;

mixing the solution of neutralized polymer salt with water to form a blend of water/organic solvent/neutralized polymer; and removing the organic solvent from the blend at a temperature and pressure which is effective to not invert the blend and which provides a stable aqueous polymer dispersion which is substantially free of emulsifier and which polymer has a mean particle size of not more than about 300 nm and the aqueous dispersion has less than about 2 weight percent organic solvent, at least about 30 weight percent solids, and a viscosity of less than about 20 poise at a temperature of about 25 degrees C.

2. A process as recited in claim 1 wherein the acid value of the polymer during the condensation reaction is not more than about 40.

3. A process which forms a stable aqueous dispersion of an acrylic polymer which dispersion is substantially free of an emulsifier, the process comprising:

forming an acrylic polymer having a number average molecular weight greater than about 3,000 by an addition reaction, the polymer formed in the addition reaction having an acid value in the range of from about 10 to about 40, wherein the polymer is formed in an organic hydrophilic solvent to form a solution of the polymer in the organic solvent, the polymer is soluble in the hydrophilic organic solvent, and the organic hydrophilic solvent has a solubility in water of at least about 5 weight percent;

neutralizing the ionizable groups of the polymer by mixing the polymer with an amount of neutralizer effective to form a neutralized polymer salt and form a solution of the neutralized polymer salt;

mixing the solution of neutralized polymer salt with water to form a blend of water/organic solvent/neutralized polymer; and removing the organic solvent from the blend at a temperature and pressure which is effective to not invert the blend and which provides a stable aqueous polymer dispersion which is substantially free of emulsifier and which polymer has a mean particle size of not more than about 300 nm and the aqueous dispersion has less than about 2 weight percent organic solvent, at least about 30 weight percent solids, and a viscosity of less than about 20 poise at a temperature of about 25 degrees C.

4. A process as recited in claim 3 wherein the acid value of the acrylic polymer during the addition reaction is not more than about 40.

5. A process which forms a stable aqueous dispersion of a hybrid polymer, which dispersion is substantially free of an emulsifier, the process comprising:

forming a hybrid of a polymer having a number average molecular weight greater than about 2,000, the hybrid of a polymer selected from the group consisting of polyester, alkyd, and acrylic polymers, wherein the hybrid is a combination of a polyester polymer and an acrylic polymer or an alkyd polymer and an acrylic polymer, wherein the acid value of the polyester polymer, the alkyd polymer and the acrylic polymer does not exceed about 40, wherein the hybrid polymer has an acid value in the range of from about 10 to about 40 and is formed in or is mixed in an organic hydrophilic solvent to form a solution of the hybrid polymer in the organic solvent, and the organic hydrophilic solvent has a solubility in water of at least about 5 weight percent;

neutralizing the ionizable groups of the hybrid polymer by mixing the hybrid polymer with an amount of neutralizer effective to form a neutralized polymer salt and form a solution of the neutralized polymer salt;

mixing the solution of neutralized polymer salt with water to form a blend of water/organic solvent/neutralized polymer; and removing the organic solvent from the blend at a temperature of not more than about 65° C. and pressure which is effective to not invert the blend and which provides a stable aqueous polymer dispersion which is substantially free of emulsifier and which polymer has a mean particle size of not more than about 300 nm and the aqueous dispersion has less than about 2 weight percent organic solvent, at least about 30 weight percent solids, and a viscosity of less than about 20 poise at a temperature of about 25 degrees C.

6. A process as recited in claim 5 wherein the polyester polymer and alkyd polymer are condensation polymers and the acrylic polymer is an addition polymer, the acid values during the formation of the condensation and addition polymers which form the hybrid polymer are not more than about 40, and the number average molecular weight of the alkyd polymer and the polyester polymer is not more than about 10,000.

7. A process according to claim 1, wherein the polymer has a solubility in the organic hydrophilic solvent of at least about 50 weight percent.

8. A process according to claims 1 or 2 wherein the neutralizer is selected from the group consisting of ammonia, triethanol amine, 2-amino-2-methyl-1-propanol, dimethyl ethanol amine, alkali metal hydroxide and mixtures thereof.

9. A process according to claims 1 or 2 wherein water is mixed in an amount effective to provide an initial ratio of organic solvent to water of about 1 to about 3.5.

10. A process according to claims 1 or 2 wherein water is mixed in an amount effective to provide an initial ratio of organic solvent to water of about 1 to about 1.5.

11. A process according to claims 1 or 2 wherein the organic hydrophilic solvent is removed at not more than about 65° C.

12. A process according to claim 8 wherein the organic hydrophilic solvent is removed at not more than about 65° C.

13. A process according to claim 9 wherein the organic hydrophilic solvent is removed at not more than about 65° C.

14. A process according to claim 8 wherein the organic hydrophilic solvent is removed at not more than about 65° C.

15. A process as recited in claims 7, 1 or 2 wherein the ionizable groups are selected from the group consisting of —COOH, —SO$_3$H, —PO$_4$H$_2$, and mixtures thereof.

16. A process as recited in claims 7, 1 or 2 wherein the ionizable group is —COOH and from about 30 to about 100 percent of the —COOH groups are neutralized and water is added to the solution of neutralized polymer salt.

17. A process as recited in claims 7, 1 or 2 wherein the ionizable group is a —COOH group and from about 30 to about 100 percent of the —COOH groups are neutralized and water is added to the solution of neutralized polymer salt.

18. A process according to claims 3 or 4 wherein the neutralizer is selected from the group consisting of ammonia, triethanol amine, 2-amino-2-methyl-1-propanol, dimethyl ethanol amine, alkali metal hydroxide and mixtures thereof.

19. A process according to claims 3 or 4 wherein water is mixed in an amount effective to provide an initial ratio of organic solvent to water of about 1 to about 3.5.

20. A process according to claims 3 or 4 wherein water is mixed in an amount effective to provide an initial ratio of organic solvent to water of about 1 to about 1.5.

21. A process according to claims 3 or 4 wherein the organic hydrophilic solvent is removed at not more than about 65° C.

22. A process according to claim 18 wherein the organic hydrophilic solvent is removed at not more than about 65° C.

23. A process according to claim 19 wherein the organic hydrophilic solvent is removed at not more than about 65° C.

24. A process according to claims 5 or 6 wherein the neutralizer is selected from the group consisting of ammonia, triethanol amine, 2-amino-2-methyl-1-propanol, dimethyl ethanol amine, alkali metal hydroxide and mixture thereof.

25. A process according to claims 5 or 6 wherein water is mixed in an amount effective to provide an initial ratio of organic solvent to water of about 1 to about 3.5.

26. A process according to claims 5 or 6 wherein water is mixed in an amount effective to provide an initial ratio of organic solvent to water of about 1 to about 1.5.

27. A process according to claim 24 wherein the organic hydrophilic solvent is removed at not more than about 65° C.

28. A process according to claim 25 wherein the organic hydrophilic solvent is removed at not more than about 65° C.

29. A process as recited in claim 12 wherein the ionizable group is a —COOH group and from about 30 to about 100 percent of the —COOH groups are neutralized and water is added to the solution of neutralized polymer salt.

30. A process as recited in claim 13 wherein the ionizable group is a —COOH group and from about 30 to about 100 percent of the —COOH groups are neutralized and water is added to the solution of neutralized polymer salt.

* * * * *